United States Patent [19]

Anderson et al.

[11] Patent Number: 5,581,054
[45] Date of Patent: Dec. 3, 1996

[54] ONE-PIECE ENGINE INLET ACOUSTIC BARREL

[75] Inventors: Robert E. Anderson, Huntington Station; Charles A. Parente, Oyster Bay, both of N.Y.

[73] Assignee: Grumman Aerospace Corporation, Los Angeles, Calif.

[21] Appl. No.: 443,984

[22] Filed: May 18, 1995

Related U.S. Application Data

[63] Continuation of Ser. No. 985,909, Dec. 4, 1992, abandoned.

[51] Int. Cl.⁶ ........................................ F02K 1/00
[52] U.S. Cl. ........................ 181/213; 181/214; 181/292
[58] Field of Search ........................ 181/214, 213, 181/205, 286, 290, 292

[56] References Cited

U.S. PATENT DOCUMENTS

| | | |
|---|---|---|
| 4,023,644 | 5/1977 | Cowan et al. . |
| 4,122,672 | 10/1978 | Lowrie . |
| 4,235,303 | 11/1980 | Dhoore . |
| 4,421,201 | 12/1983 | Nelsen et al. . |
| 4,600,619 | 7/1986 | Chee et al. . |
| 4,759,513 | 7/1988 | Birbragher ........................ 181/292 X |
| 4,817,756 | 4/1989 | Carr et al. ........................ 181/214 |
| 4,826,106 | 5/1989 | Anderson ...................... 181/214 X |
| 4,850,093 | 7/1989 | Parente ........................ 29/428 |
| 4,969,535 | 11/1990 | Arcas et al. ........................ 181/213 |
| 5,014,815 | 5/1991 | Arcas et al. ........................ 181/213 |
| 5,025,888 | 6/1991 | Arcas et al. ........................ 181/213 |
| 5,175,401 | 12/1992 | Arcas et al. ........................ 181/292 |

FOREIGN PATENT DOCUMENTS

| | | |
|---|---|---|
| 1236854 | 6/1971 | United Kingdom . |
| 1456302 | 11/1976 | United Kingdom . |
| 2038410 | 7/1980 | United Kingdom . |
| 2076049 | 11/1981 | United Kingdom . |
| 2223448 | 4/1990 | United Kingdom . |
| 2247712 | 3/1992 | United Kingdom . |

*Primary Examiner*—Khanh Dang
*Attorney, Agent, or Firm*—Terry J. Anderson; Karl J. Hoch, Jr.

[57] ABSTRACT

An acoustic liner jet engine inlet barrel is formed from a perforated permeable skin, a honeycomb core, and a solid facesheet, each of which is formed in a one-piece configuration such that at most only a narrow single fore-to-aft splice, or no splice at all, is present in the finished product. The acoustic modal content remains unaffected, thus preserving a high degree of liner effectiveness, increasing the total active acoustic area of the barrel while decreasing its weight, and increasing its durability.

11 Claims, 5 Drawing Sheets

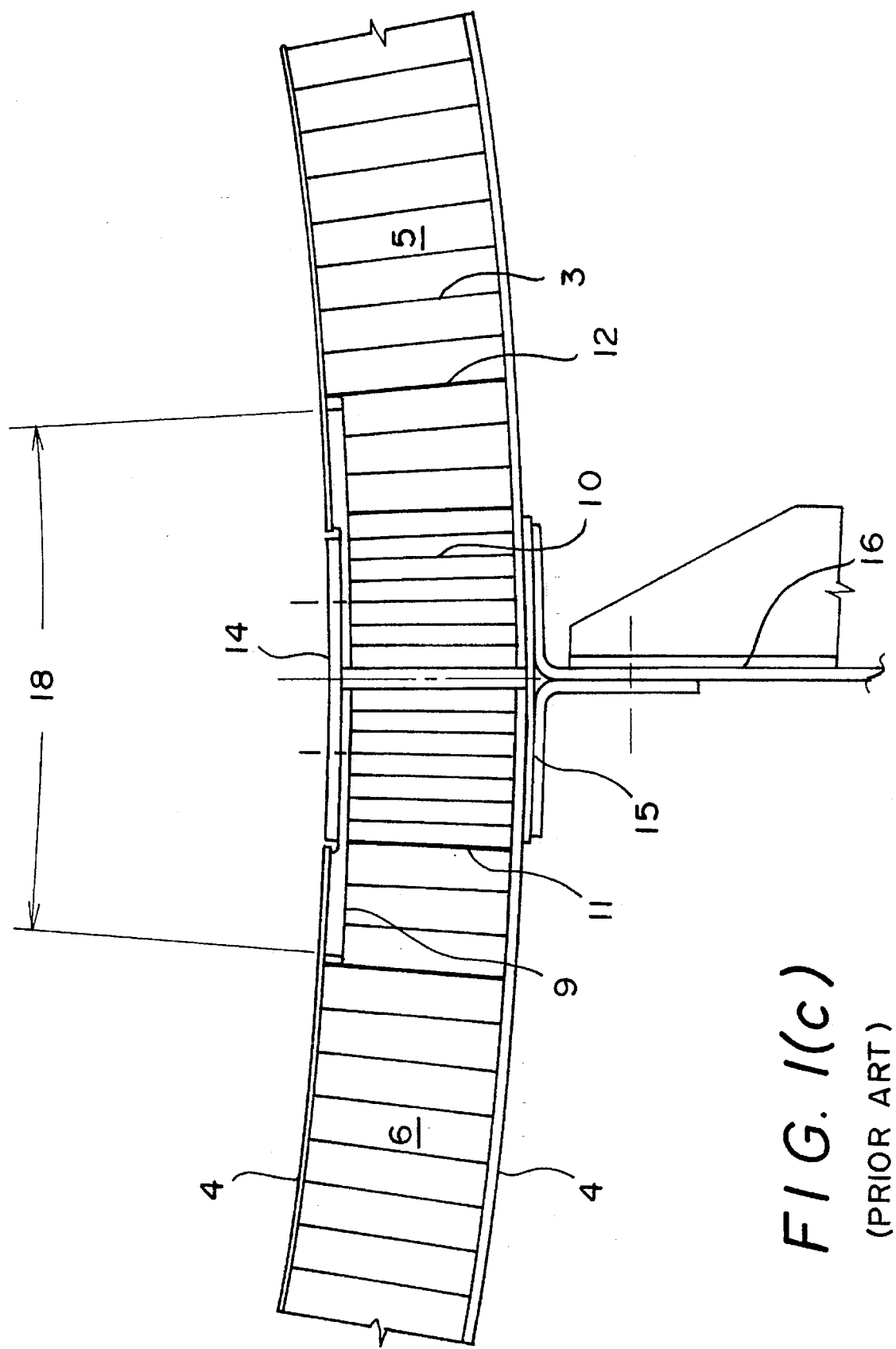
FIG. I(c) (PRIOR ART)

ONE-PIECE ENGINE INLET ACOUSTIC BARREL

This application is a Continuation of application Ser. No. 07/985,909, filed Dec. 4, 1992, now abandoned.

BACKGROUND OF THE INVENTION

1. Field of the Invention

This invention relates to an engine inlet acoustic barrel designed to attenuate dominant frequencies generated by, for example, a jet aircraft turbo-fan engine.

2. Description of Related Art

Although a jet aircraft engine nacelle inlet appears to be a simple structure, it actually embodies a sophisticated adjunct to power plant performance. While the inner surface of the inlet must be made as smooth as possible for aerodynamic reasons, acoustic considerations demand a porous air passage surface and a cavity of a defined depth behind the air passage surface. As a result, current state-of-the-art construction incorporates multiple cavities behind the air passage surface such as might be created by a honeycomb core. However, the core depth required for optimum acoustic attenuation is not necessarily equal to an optimum core depth required for the sandwich barrel structure to withstand all the aerodynamic and inertial loads to which it is subjected in service.

Current inlet acoustic barrels, including those made from metals or advanced composite materials such as graphite epoxy cloth, and/or tape, are constructed from two or three curved segments that are fastened or spliced together to create a nearly cylindrical shape. The segments are constructed, starting from the inlet's inside air-passage surface, of a permeable inner facesheet, a honeycomb core, and a solid non-permeable back facesheet, and are fastened together along splice lines running in the fore-aft direction. The splice lines involved in such designs are generally made of a non-permeable structural attachment material and have several disadvantages, among them that the splice lines decrease the total active acoustic area. In addition, the presence of splices causes the acoustic modes generated by the fan to be altered to lower order modes, which are difficult to attenuate and thus decrease the efficiency of the liner. Other disadvantages of the splice lines include an increase in the structural weight of the barrel, and stress concentrations at the splice lines.

Examples of composite acoustic jet engine liners are disclosed in U.S. Pat. Nos. 5,025,888, 5,014,815, 4,969,535, 4,840,093, 5,175,401, and 5,151,311, each of which is incorporated herein by reference.

The barrel schematically illustrated in FIG. 1(a) represents a currently existing production barrel 1 of the type disclosed in the above-mentioned patents and patent applications. Barrel 1 includes a splice 2 every 120°. The core structure 3 of barrel 1 in the area of the splice may be tapered or stepped, with facesheets 4 formed to facilitate attachment of two sections 5 and 6 using a splice strap 7 and an intracoastal support 8, as shown in FIG. 1(b), which is typical of fiber reinforced composite construction. Alternatively, the core structure may simply be abruptly terminated, as shown in FIG. 1(c), with attachment facilitated by a structural doubler 9, a densified core 10, structural core splices 11, and optional core splices 12, in addition to splice straps 14 and 15 and intracoastal support 16. This example of an existing barrel is more typical in metallic construction. The total area lost by the splice in both FIG. 1(b) and 1(c) is indicated by arrow 18.

Thus, the conventional inlet acoustic barrels constructed from two or three (and possibly more) nearly equally sized curved structural sandwich panel segments are usually fastened together along splice lines with discrete fasteners, to create a nearly cylindrical shape. This segmental construction presumes that each of the segments, by itself, is designed to support in-plane and bending loads as a curved sandwich plate of, starting from the inlet air-passage surface, the above-mentioned perforated permeable facesheet, a core, possibly in the form of a honeycomb core, and, the solid i.e., non-perforated back facesheet.

The sandwich plates are fastened together along a splice-line running in the fore-aft direction, the construction of the panel-to-panel boundary splice line being of necessity more robust that the interior region of the sandwich. The in-plane and bending loads that are distributed rather uniformly in the field of the curved plane must be transmitted through discretized load paths of the individual fasteners connecting panels to each other and, in some instances, to surrounding structure such as intracoastals, rings, or attachment fittings.

Metallic, as well as traditionally configured, advanced composite sandwich designs adhere to the structural philosophy that all required bending rigidity should be developed by causing the inner and outer facesheets to act as a structural sandwich in differential bending and that the core-material between facesheets should support substantially all the shear loads. Under other circumstances, this usually provides a very efficient structure. However, in the case of acoustic barrels, the perforated facesheet 23 near the air passage surface, which may be covered on either side with another material such as stainless steel, woven wire, or a similar-finely porous material to enhance acoustic performance, serves a dual role. It acts as an element of a tuned Helmholtz resonator for acoustic attenuation, as well as a structural-sandwich facesheet that supports loads in differential bending.

Since the air passage facesheet must be perforated for acoustic performance, its cross-sectional area through its thickness is greatly reduced for the purpose of resisting in-plane loads due to direct stretching or differential bending. As a result, the perforated facesheet thickness must be sized to meet structural demands that may conflict with what might be optimum for maximum acoustic performance. In particular, the perforated facesheet thickness must be increased beyond that needed just to replace the volume of material removed from the holes because of the stress concentrations around each hole. The extra thickness required also tends to reduce acoustic performance, because it increases an acoustic property of the perforate called "mass reactance" which is related to the dynamics of vibrating the slug of air contained in the perforated hole. Since acoustic performance is sensitive to the phenomenon, it would be preferable to size the facesheet thickness based on acoustic considerations without having to make concessions to structural requirements. Generally, a thinner perforated facesheet is preferred.

The preferred embodiments of the invention, on the other hand, use an alternative design philosophy that is closer to pure monocoque construction and which offer significant benefits compared to the current art. The basic feature of a one-piece monocoque is that the primary loads are supported by a single continuous structural shell. While the core and permeable facesheet supports some internal loads by virtue of strain compatibility, they can be thought of as nearly parasitic when incorporated in a monocoque or ring stiffened barrel such as described herein.

The preferred forms of the invention, which will be described in more detail below, obviate all discrete seams and splices, especially in the fore-aft direction. Some inlet constructions call for the use of a microporous air passage layer, while other noise attenuation systems may require only the use of discretely perforated air passage skins. Usually, this choice is dictated by the engine manufacturer who is familiar with the noise characteristics of the engine. In either case, the preferred forms of the invention seek to maintain uniformity of the structure and material associated with the acoustic attenuation system in particular, and the entire structural system in general.

This does not mean that the facesheet porosity may not vary over the entire area in some controlled, predetermined way, or that core thicknesses and cell size must be constant everywhere. In fact, controlled variability may be desirable in certain cases. However, the presence of hardwall regions, i.e., abrupt changes from acoustically treated to acoustically untreated regions, especially fore and aft strips of untreated hardwall areas such as found in splice areas, are to be avoided whether or not the system includes some form of microporous facesheet. The presence of hardwall strips (splices) alters the tones generated by the engine in currently unpredictable ways and reduces the essentially tuned liner's effectiveness to attenuate noise energy at desired frequencies.

Although the advantages of composite material technology in reducing the number of parts in aircraft structures have long been recognized, for example as described in U.S. Pat. No. 4,826,106, the acoustic advantages of such a design, in particular as applied to an aircraft engine nacelle, have not been appreciated. U.S. Pat. No. 4,826,106, for example, proposes the formation of fittings in a jet engine cowling assembly as a one-piece structure. In this patent, however, the term "one-piece" refers to the formation of various parts of the cowling using "judiciously placed graphite/epoxy unidirectional tape layers" to form integrated, seamless structures, but not to the elimination of fore-to-aft splices.

SUMMARY OF THE INVENTION

It is a principal objective of the invention to provide an improved acoustic liner jet engine inlet barrel formed from a perforated permeable inner facesheet, a core structure, and a solid facesheet, and having at least the following advantages: an increase in total active acoustic area, unaltered acoustic modal content, reduced structural weight, and reduced stress concentrations at joint connections by eliminating the joints entirely.

It is a second principal objective of the invention to provide a method of making an acoustic liner jet engine barrel formed from a perforated permeable inner facesheet, a honeycomb core structure, and a solid facesheet, the resulting inlet barrel having an increased total active acoustic area, unaltered acoustic modal content, reduced structural weight, and elimination of stress concentration at joint connections.

These objectives are accomplished by providing a one-piece composite acoustic barrel having a perforated facesheet facing an interior of the barrel, a core structure conventionally in the form of a honeycomb core, and a non-perforated back facesheet, each of which is formed in a one-piece configuration such that no splice at all or at most only a single narrow fore-to-aft splice is formed in the finished product. No-splice embodiments of the invention are formed by overlapping the constituent materials which form the respective facesheet layers, and by joining respective ends of the core structure such that no gap or blockage exists at the joint.

The inventive method is accomplished, in one preferred embodiment of the invention, by wrapping a continuous piece of graphite/epoxy cloth around a core form at least 360°, so that ends of the cloth are located a substantial distance apart on the form, and then curing the graphite/epoxy material to form a facesheet structure. The core structure, preferably a honeycomb core, is formed without a splice by, for example, pushing ends of the core structure together, with no glue or mechanical connections, until the core forms an integral unit, after which the completed core within the facesheet, and the two layers are glued together by reticulation. The remaining non-permeable facesheet layer may also be pre-formed and secured by adhesive bonding to the core, or may preferably be added to the structure by co-curing with the core, depending on the viscosity and adhesive qualities of the facesheet material.

In an especially advantageous embodiment of the invention, the non-perforated backing facesheet as shown by items 20, 21, 22, 26 and 27 is built up to form structural components of the inlet barrel as shown in FIGS. 3 and 4 which would ordinarily be provided in the form of separate detail parts, thus reducing the total weight of the structure.

The purpose of the invention, exemplified by the preferred embodiments, is to minimize to the greatest extent possible any non-uniformity or discontinuities in the acoustic and structural aspects of the perforated and/or microporous facesheet on the side that the sound waves infringe upon as well as to maintain continuity of the cellular correlator and the non-porous/non-perforated backface sheet in the circumferential direction. This construction serves 1) to preserve the purity of the acoustic modes generated by the engine allowing for better noise attenuation by the essentially tuned acoustic impedance inherent in the fixed geometry and porosity facesheet, core depths, etc. 2) to increase the total active acoustic area, and 3) to improve the structural performance of the inlet barrel.

BRIEF DESCRIPTION OF THE DRAWINGS

FIGS. 1(b) and 1(c) are enlarged cross-sectional views of typical constructions of the barrel of FIG. 1(a) in the area of one of the splices.

DETAILED DESCRIPTION OF THE PREFERRED EMBODIMENTS

Figure 1B:
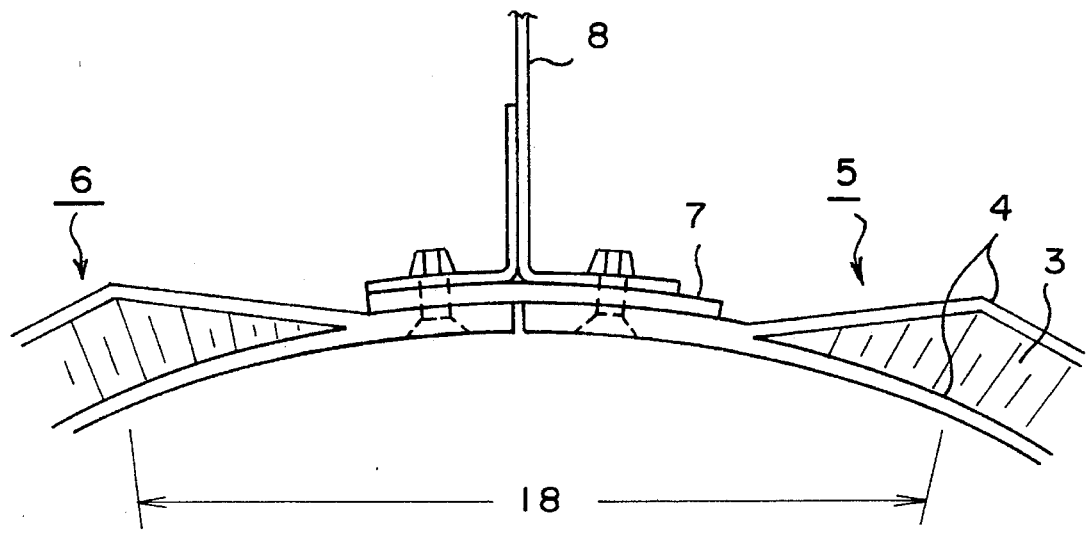
Figure 1A:
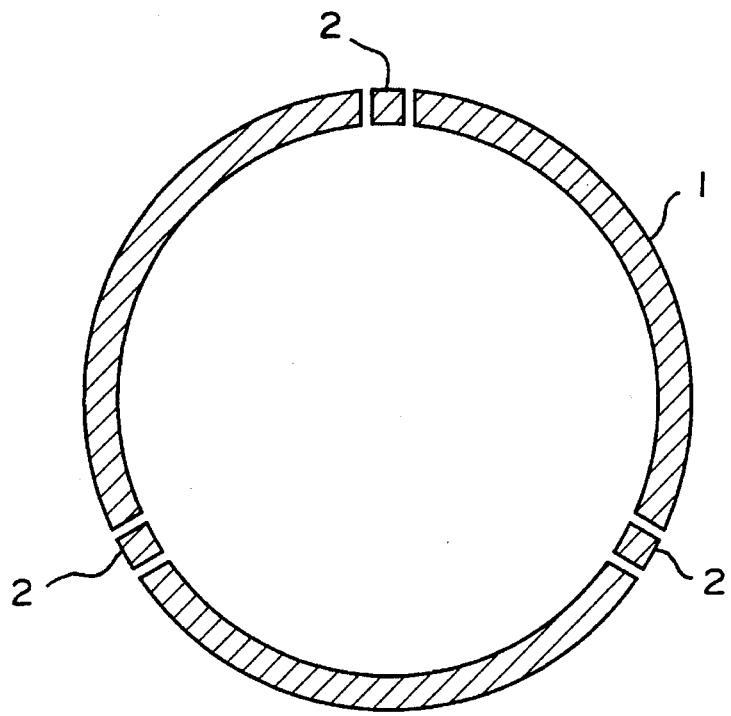
FIG. 1(a) schematic cross-sectional end view of a conventional acoustic liner inlet barrel having a splice every 120°.
Figure 2B:
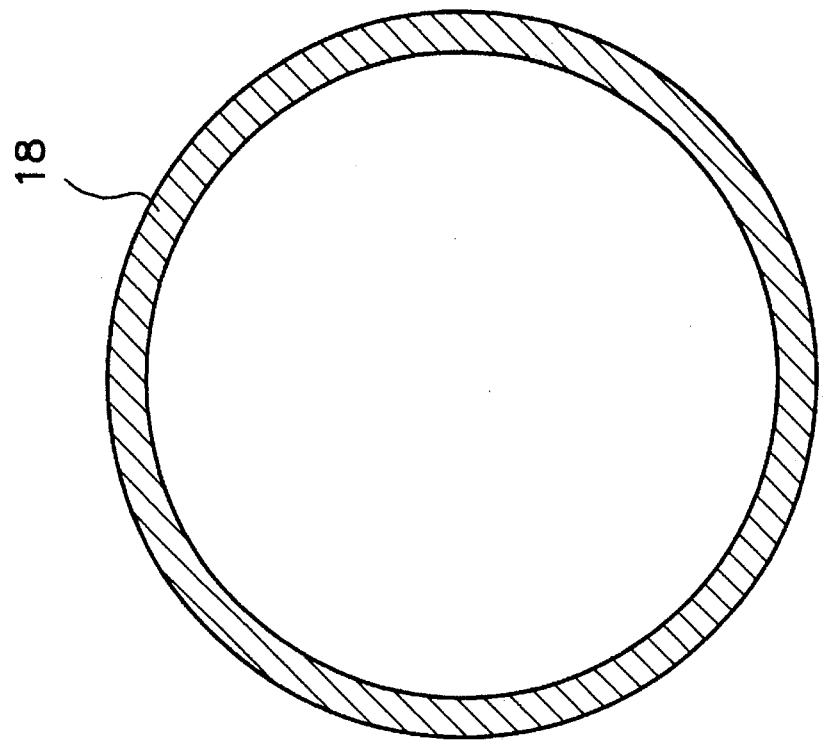
FIG. 2(b) is a schematic cross-sectional end view of a one-piece spliceless acoustic liner inlet barrel constructed in accordance with the principles of a second preferred embodiment of the invention.
Figure 2A:
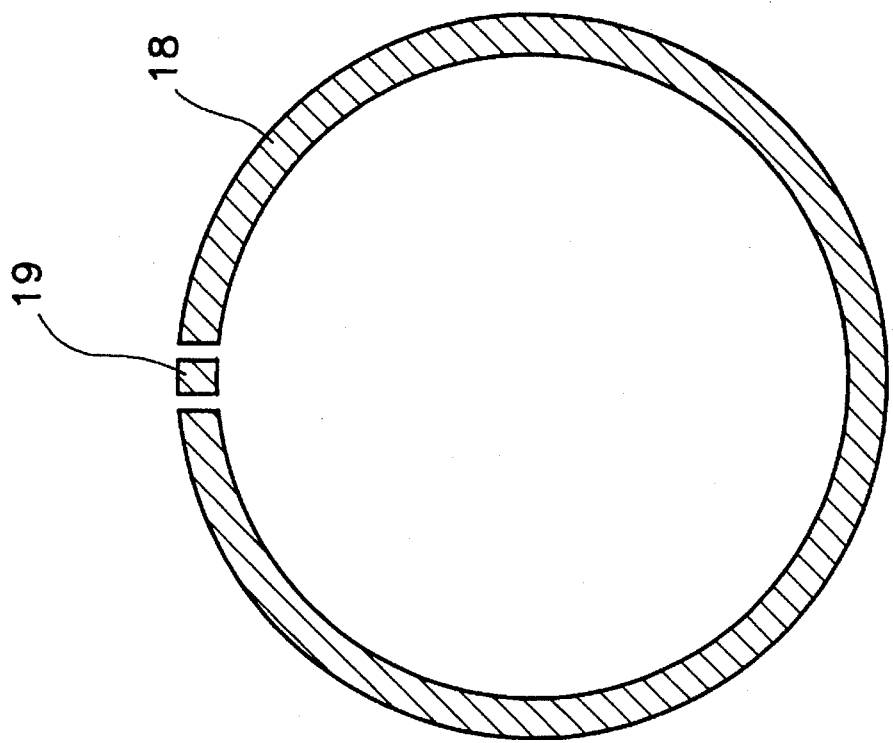
FIG. 2(a) is a schematic cross-sectional end view of a one-piece single splice acoustic liner inlet barrel constructed in accordance with the principles of a first preferred embodiment of the invention.

In accordance with preferred embodiments of the invention, an acoustic liner inlet barrel is formed as one continuous piece when viewed in cross-section facing the longitudinal direction of the barrel, rather than three pieces with splices as shown in FIGS. 1(a), 1(b), and 1(c). This one-piece acoustic liner inlet barrel design is schematically depicted in FIGS. 2(a) and 2(b). Essentially, the liner inlet barrel shown in FIG. 2(a) and 2(b) is formed by manufacturing a continuous one-piece liner backface sheet and either splicing the ends of the core and perforated microporous facesheet together, at splice 19 at splice 21 as shown in FIG. 2(a), or using a variety of techniques which result in a finished product which has no splice at all, as shown in FIG. 2(b).

Figure 3:
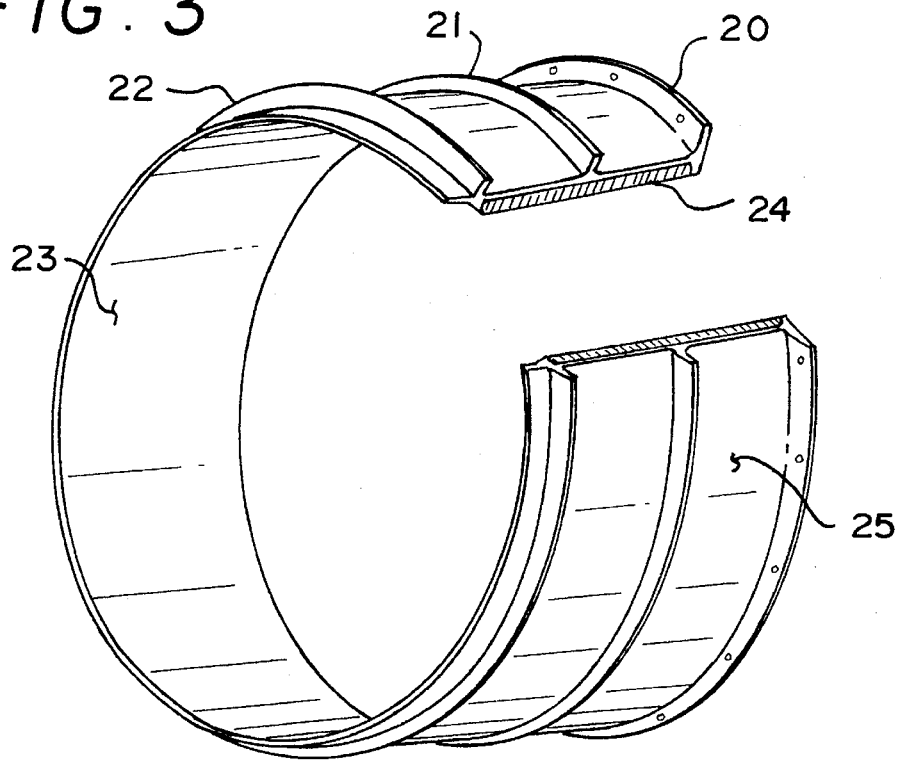
FIG. 3 is a partially cut-away perspective view a first version of a unitized barrel assembly embodying the principles illustrated in FIGS. 2(a) and 2(b).
Figure 4:
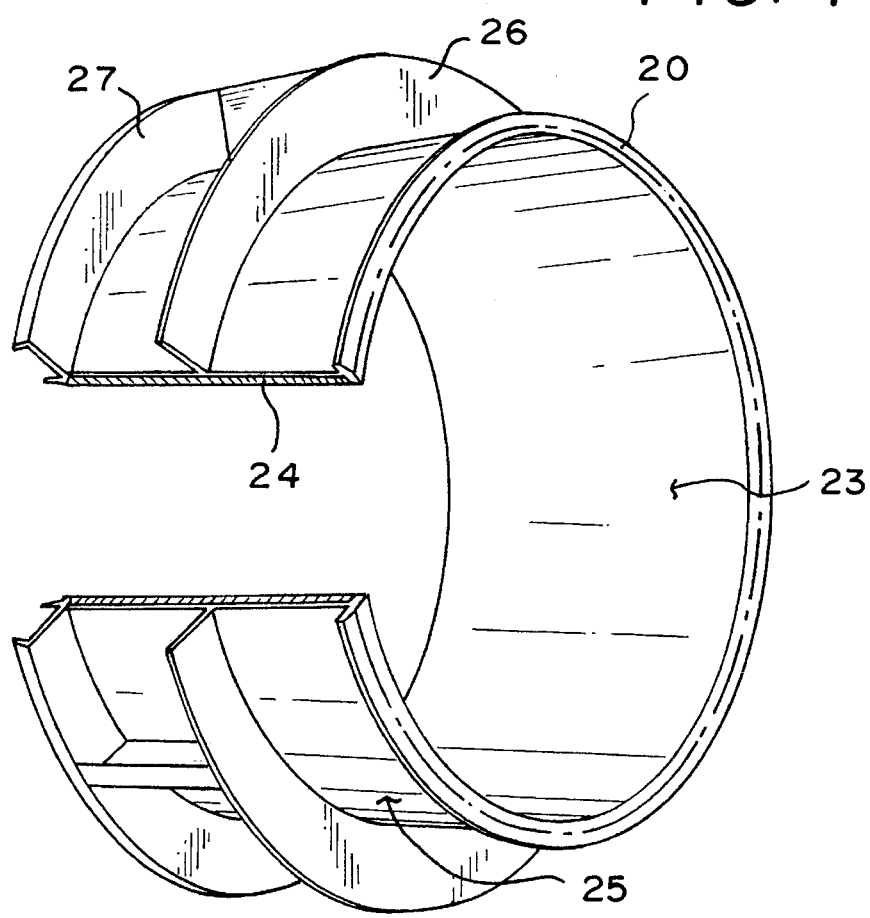
FIG. 4 is a partially cut-away perspective view of a variation of the unitized barrel assembly of FIG. 3.

The one-piece liner 18 of FIG. 2(a) is substantially cylindrical and includes, as illustrated in greater detail in FIGS. 3 and 4, a perforate and/or microporous facesheet 23, a honeycomb core 24 and a solid backing facesheet 25 constructed in a conventional manner except that the structure is continuous in the circumferential direction over an angle of 360°. The splice area 19 of FIG. 2(a) is formed in such a manner that the resulting splice is as narrow as possible so that it approaches the limit of no splice as shown in FIG. 2(b).

The preferred method of making the single-splice barrel differs from the method taught in U.S. Pat. No. 4,826,106 in that it is for an engine inlet barrel rather than an aircraft engine translating aft cowling, and in that instead of forming sections of less than 180° each, the barrel is formed in one piece which extends over an angle of 360. While the materials may be the same as disclosed in U.S. Pat. No. 4,826,106, other suitable composite or metallic materials will occur to those skilled in the art and are intended to be included within the scope of the invention.

In practice, construction of embodiments that do not require inclusion of a separate microporous layer will consist of, from the inside out, the perforated laminate 23, a layer of glue (not shown), the honeycomb core 24, a layer of glue (not shown), and the nonporous, continuous, backing facesheet 25. The layers of glue on the inside and outside of the core may be brought to the assembly as discrete layers, or, under controlled conditions, the bond between core and either facesheet can be made with the resin from the contiguous laminates.

If a microporous facesheet is required, it may be incorporated either as the air passage (first) layer or just beneath the air passage perforate. In either case, if the microporous layer (which may be made for example of a woven mesh and which is used to obtain desired acoustic properties of the liner) is only available in sheet form, its ends must be joined on the circumference in a manner that results in a discontinuity of material physical and mechanical properties, i.e., a splice. This is a concession to practicality that may have to be accepted for reasons of cost, but there are also methods of weaving cylindrical geometries that may be employed, at additional cost, to obviate the need for a splice even in this layer.

The perforate facesheet can be a fiber reinforced laminate such as graphite/epoxy, graphite/bismalyimide, glass/epoxy or other such material that might occur to those skilled in the art. The holes may be molded into the laminate in a separate curing process or molded into the facesheet during a co-curing/bonding operation that includes the core and/or the solid back facesheet. One form of the construction may use a metallic porous facesheet made circumferentially continuous by some form of welding and subsequently formed to near-cylindrical shapes by magnaforming or other similar processes. In order to eliminate the facesheet seams, the facesheets may, for example, be formed by wrapping the facesheet material around a form to an angle of greater than 360° before curing. The core structure may be formed by applying pressure to ends of a honeycomb to thereby push them together until no seam is apparent.

Figure 5A:
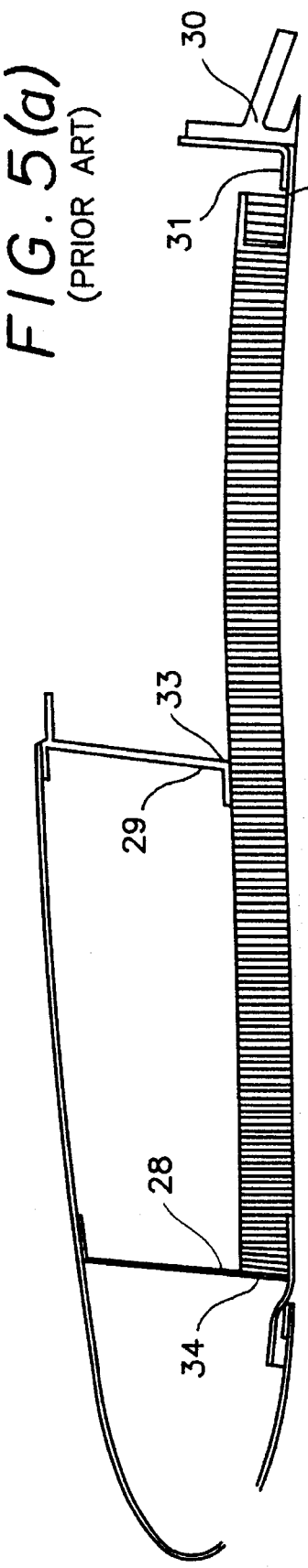
FIG. 5(a) is a cross-sectional side view of a conventional jet engine nacelle structure with a state-of-the-art acoustic liner.
Figure 5B:
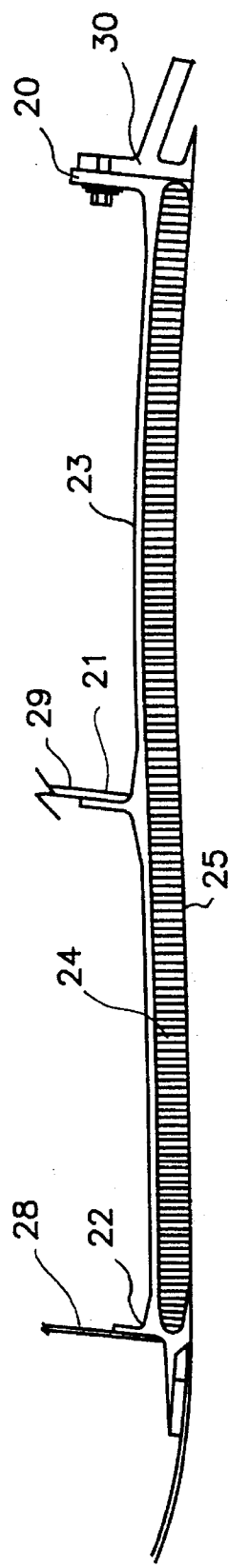
FIG. 5(b) is a cross-sectional side view of the barrel assembly of FIG. 3.

In the preferred embodiment of the invention, shown in FIGS. 3 and 5(b), integral fittings are provided by weaving or braiding graphite yarn into a preform, for example in the manner taught in U.S. Pat. No. 4,826,106. These preforms are then impregnated with an epoxy or other resin so that they can easily and quickly be added to the wet barrel assembly and cured simultaneously with the acoustic sandwich to create a non-splice continuous structure without the need for separate discrete fastener attachment. This results in a lighter weight, more durable structure. These include an integral engine mounting flange 20 to which engine frame 30 is attached at an aft end of the barrel, a firewall ring frame attachment flange 21, and leading edge (L.E.) frame attachment flange 22 at the forward end. FIGS. 3 and 5(b) also show the perforated facesheet 23, honeycomb core 24, and non-porous facesheet 25, The barrel structure of FIGS. 3 and 5(b) may either have a single splice or no splice. A portion of the structure has been cut away to reveal the core 24.

Figure 5C:
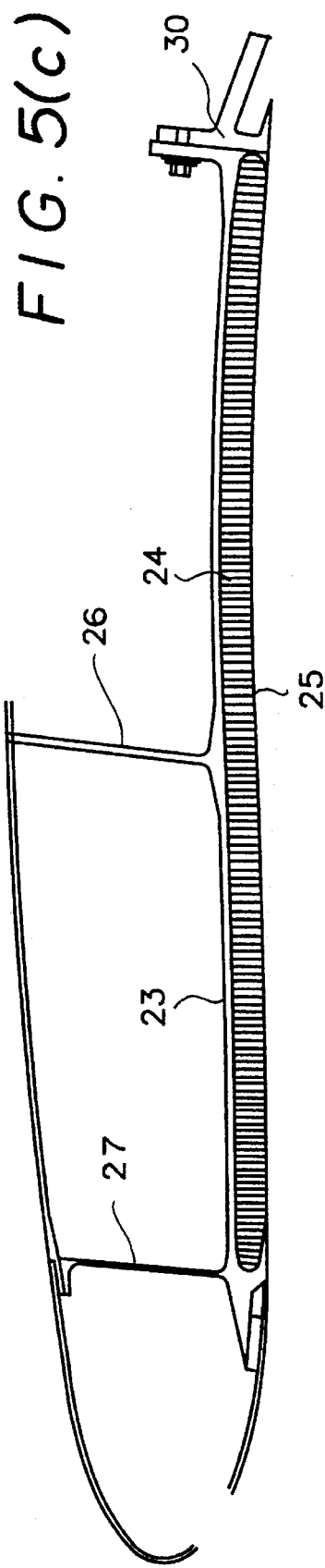
FIG. 5(c) is a cross-sectional side view of the barrel assembly of FIG. 4.

In another preferred embodiment, it is possible to add the firewall ring frame 26 and the L.E. ring frame 27 by building up the attachment flanges, as shown in FIGS. 4 and 5(c), in order to replace the conventional ring structures 28 and 29 shown in FIG. 5(A) by a firewall ring 26 and an L.E. ring 27. As a result, even with an increased acoustic area, the weight of the barrel including anti-ice installation is actually reduced, as is the cost, relative to the acoustic inlet barrel shown in FIG. 5(a), which is a state-of-the-art construction with non-integral fittings 31 to 35.

Having thus described in detail specific preferred embodiments of the invention, it is nevertheless intended that the invention not be limited by the above description, but rather that it be interpreted solely in accordance with the appended claims.

We claim:

1. An engine inlet acoustic barrel having a one-piece monocoque structure, said barrel being substantially cylindrical in shape and having a forward end, an aft end, and an air passage surface in an interior of the cylindrically-shaped barrel, comprising, from the air passage surface outward:

a one-piece inner facesheet;

a continuous one-piece core structure surrounding said inner facesheet; and a continuous one-piece non-porous back facesheet surrounding said core structure, wherein said one-piece inner facesheet and said one-piece core structure have no splices extending from said forward end to said aft end, and wherein the back facesheet is fully continuous, the one-piece inner facesheet, one-piece core structure, and one-piece back facesheet thereby forming said one-piece monocoque structure.

2. An engine inlet acoustic barrel as claimed in claim 1, wherein said inner facesheet is porous.

3. An engine inlet acoustic barrel as claimed in claim 1, wherein said inner facesheet is microporous.

4. An engine inlet acoustic barrel as claimed in claim 1, wherein said non-porous back facesheet is spliceless.

5. An engine inlet acoustic barrel as claimed in claim 1, wherein said inner and back facesheets are graphite/epoxy facesheets and said core structure is a honeycomb type core.

6. an engine inlet acoustic barrel as claimed in claim 1, wherein said non-porous back facesheet includes an integral engine mounting flange.

7. An engine inlet acoustic barrel as claimed in claim 1, wherein said non-porous back facesheet includes an integral firewall ring attachment flange.

8. An engine inlet acoustic barrel as claimed in claim 1, wherein said non-porous back facesheet includes an integral leading edge ring attachment flange.

9. an engine inlet acoustic barrel as claimed in claim 1, wherein said non-porous back facesheet includes an integral firewall ring.

10. An engine inlet acoustic barrel as claimed in claim 1, wherein said non-porous back facesheet includes an integral leading edge ring.

11. An engine inlet acoustic barrel as claimed in claim 2, further comprising a microporous screen positioned on an air passage side of the inner facesheet, said microporous screen having at most one splice.

* * * * *